Oct. 28, 1941. F. MARASSO 2,260,752

CONTAINER COVER LOCKING MECHANISM

Filed March 2, 1939

INVENTOR.
Fred Marasso,
BY Charles O. Shurvey
his ATTORNEY.

Patented Oct. 28, 1941

2,260,752

UNITED STATES PATENT OFFICE 2,260,752

CONTAINER COVER LOCKING MECHANISM

Fred Marasso, Joliet, Ill., assignor to Union Machinery Company, Joliet, Ill., a corporation of Illinois Application March 2, 1939, Serial No. 259,420

1 Claim. (Cl. 220—55)

This invention relates to container cover locking mechanism and the subject matter thereof is a continuation in part of my recent application for patent on Combined dividers and rounders, Serial No. 150,566, filed June 26, 1937, now Letters Patent No. 2,119,018. It is also a continuation in part of my pending application for patent on Container cover operating mechanism, Serial No. 188,406, filed February 3, 1938.

In bakers' machinery, such as dough dividers and combined dividers and rounders, a container or tank is employed for holding a batch of dough which is to be divided into small lumps of predetermined size and weight, and with certain types of dividers, air pressure is applied to the dough in the tank to feed the dough to the dividing mechanism, and in such cases the container is provided with a closure or cover which must have an air tight joint with the container to prevent leakage of air. These covers are heavy and somewhat difficult to handle by hand.

One object of the present invention is the provision of simple and easily manipulated cover locking mechanism whereby the cover may be locked down tight on the container against the leakage of air when the pressure is applied to the dough contained in the container.

Other objects and advantages will appear in the course of this specification and, with all of said objects and advantages in view, this invention consists in the several novel features of construction, arrangement and combination of parts, hereinafter more fully described and claimed.

The invention is clearly illustrated in the accompanying drawing, in which:

Fig. 1 is a side elevation, partly broken out of a container and cover, illustrating one form of the present cover locking mechanism.

Fig. 2 is a view looking at the underside of the cover and container top.

Fig. 3 is a plan of the cover and container top.

In the embodiment of the invention illustrated, the reference character 34 illustrates a container or tank for holding a batch of dough, and 35 designates a cover or closure for the open top thereof. The lower end of the container is desirably in the form of a hopper 37, to the open lower end of which is secured a flaring collar 38 which surrounds the extreme lower end of the hopper, and in the form illustrated, the collar is formed with a bracket 39 supported upon a standard (not shown), which in accordance with the disclosure of my said prior application, is secured to a platform of the divider. The container may, however, be supported by any suitable bracket to adapt it to any particular machine. An air supply pipe 36 leads from the upper end of the container to a source of air under pressure. The cover locking mechanism will now be described:

As shown, the cover 35 is dome-shaped and is carried by upright rod 82, the upper end of which enters a socket in an arm 83, which is rigidly fastened to the top of the cover. The rod extends down along the side of the container and is slidably held in lugs 84, 85, that are secured to and project from the side of the container. A collar 86 fast on the rod 82 rests on the lug 85, and normally supports the rod thereon. A slight clearance between the top of the rod and the end of the socket permits the cover to seat perfectly on the top of the container in the down position of the rod. The cover is raised and lowered by a lever 88, fulcrumed on a bar 87 fastened to the lugs 84, 85, and a link 90 connected to the lever and to a collar 91 fast on the rod 82 as is more fully explained in the applications from which this application has been divided.

To the upper end of the container wall is welded or otherwise suitably connected, a tapered ring 99 which forms the top of the container. The inner edge of the ring terminates in an upstanding annular rim or flange.

Normally, the cover rests upon the rim or flange of the ring 99 and the rod is supported by the lug 85. To uncover the container, the lever 88 is swung upward, thereby raising the link 90 and rod 82 and therewith the arm 83 and cover 35. When raised, the cover may be swung to one side of the container, whereby a batch of dough may be deposited into it from above. To close the cover, it is swung back over the container and the lever 88, lowered to its normal position. In order to center the cover on the container, a forked centering member 95 is fastened to the top ring of the container and a finger 96 is fastened to the cover in position to center the cover when the finger enters the notch of the forked centering member 95.

To lock the cover tightly on the container, a series of radially disposed lock bolts 80 are provided which have bolt heads that are guided in apertured lugs 98 that project down from a flange 108 on the underside of the cover adjacent its margin. The bolt heads are tapered along their outer ends and engage with the under side of the correspondingly tapered top ring 99 directly under the rim or flange. The bolts are pivotally connected to a rotatable disc 100 as by bolts and nuts 102. Desirably, the bolts comprise bolt heads 97, stems 101 pivotally connected with the disc and threaded adjustment rods 103 having right and left threads that engage in the bolt heads 97 and stems 101. Lock nuts on the adjustment rods bear against the bolt heads and stems and lock the bolt parts together. The disc is rigidly secured to a stem 104 rotatively mounted in a hollow boss 105 formed on the cover. The stem protrudes from the upper side of the cover and has a handle 106 fastened upon it, by means of which the stem and disc may be partially rotated to withdraw and project the bolts. A stop 107 is positioned on the cover to limit the throw of the handle in the locked position of the bolts, whereby the pivotal connection between the links and disc may be moved past the dead center to positively lock the bolts in their projected position.

To unlock the cover, the handle 106 is turned away from the stop, thereby turning the disc and retracting the bolts from their engagement with the ring 99.

To prevent air leakage through the clearance space between the stem 104 and the boss 105, a soft metal washer 108 is interposed between the boss and disc 100. A gasket 111 secured in an annular groove on the underside of the cover engages with an upturned rim of the ring 99 and makes an air tight joint between the container and cover.

To insure that all of the bolts bear against the ring 99 uniformly when in locked position, the threaded adjustment rods 103 are turned up to bring all of the lock bolts into close contact with the top ring and the lock nuts then screwed up tight. This is done before the top ring is welded to the side wall of the container.

I claim as new and desire to secure by Letters Patent:

In combination, a container, a tapered top ring therefor, a vertically movable and horizontally swingable cover adapted to seat on said top ring, apertured lugs projecting down from said cover, a series of radially disposed lock bolts guided in said lugs and having tapered ends adapted to be projected against the underside of the tapered top ring, each of said lock bolts including a bolt head, a stem and an adjustment screw having right and left threads engaging the bolt head and stem respectively, for lengthening and shortening the lock bolts, a disc upon which the inner ends of the lock bolts are pivoted, a stem secured to disc and projecting out through the cover, a handle mounted on said stem exteriorly of the cover, and a lug on said cover forming a stop against which the handle is held when the lock bolts are in locked position.

FRED MARASSO.